Patented Mar. 29, 1938

2,112,434

UNITED STATES PATENT OFFICE 2,112,434

HYDROXYARALKYLAMINO ORGANIC SULPHONATES

Herman A. Bruson, Philadelphia, Pa., assignor to Röhm & Haas Company, Philadelphia, Pa.

No Drawing. Application September 28, 1936, Serial No. 102,887

15 Claims. (Cl. 260—129)

This invention relates to water-soluble condensation products of phenols with formaldehyde and primary or secondary aromatic amino organic sulphonates. The object of this invention is to convert phenols, which are difficultly soluble or relatively insoluble in water, into water-soluble sulphonates without sulphonation of the phenolic nucleus.

According to this invention, phenols, which are capable of forming methylol derivatives with formaldehyde, are reacted in neutral or alkaline solution with formaldehyde and primary or secondary amino aromatic sulphonates to form new phenolic condensation products which are soluble in water.

The reaction is applicable, in general, to monohydric and polyhydric phenols and their nuclear substituted derivatives, such as the alkyl, cycloalkyl, aralkyl, aryl, alkoxy, aryloxy, halogen, and acyl derivatives, in which at least one free position ortho or para to a phenolic hydroxyl group is available for condensation with formaldehyde to form a methylol body. The mono-alkyl ethers of dihydric phenols and the mono- or di-alkyl ethers of trihydric phenols may also be used. Resinous formaldehyde condensation products of phenol, cresol, alkylphenols, or phenyl-phenol, etc., which are in the fusible-soluble condition, can be used in lieu of the phenols themselves.

The amino aromatic sulphonates used may contain a plurality of primary or secondary amino groups or sulphonic acid groups.

The condensation is carried out by mixing the three reactants in suitable proportions in an acid-free medium, preferably in the presence of an inert solvent, such as alcohol, water, dioxane, or mixtures thereof, and heating at a temperature of from about 50° C. to 100° C. The time required to complete the reaction varies with the ingredients and may range from one to seven or more hours. Any free acidic groups in the amino sulphonates must first be neutralized with a fixed base, preferably an alkali metal base.

The exact constitution of the products obtained by this condensation is not definitely known. When the phenol used contains only one free position ortho to the hydroxyl group, one mol. each of formaldehyde and the amino sulphonate reacts with one mol. of the phenol, giving a product that apparently has the aromatic nucleus of the phenol joined to the aromatic nucleus of the amino sulphonate through a

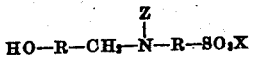

group, as $$HO-R-CH_2-N-R-SO_3X$$

where Z is hydrogen or a monovalent organic radical, and R is an aromatic nucleus.

When the phenol used has two ortho positions available for condensation, it generally requires two mols each of formaldehyde and the amino sulphonate to combine all the phenol thereby indicating that both available positions of one phenol molecule are reacted before the next molecule is attacked. Notable exceptions to this latter are phenol itself and 4-4'-dihydroxy-diphenyldimethyl methane both of which react completely with equimolecular proportions of formaldehyde and amino sulphonate. The product thus obtained can, however, be further reacted with an additional molecular equivalent of formaldehyde and amino sulphonate.

The products obtained are in every instance salts of sulphonic acids. The free acids are less soluble in water than their alkali metal salts and can be precipitated by acidifying a sufficiently concentrated aqueous solution of the alkali metal salts. Both the free acid and their soluble salts are useful as antiseptics, capillary-active compounds and as intermediates for dyestuffs, tanning and mordanting materials.

In order to illustrate the process, the following examples are given using the more readily available phenols and amino aromatic sulphonates, it being understood that the reactions are quite general for a wide variety of phenols and amino aromatic sulphonates of the broad class disclosed herein.

Example 1

A mixture consisting of 8.1 grams of 2,4-dichlorophenol, 20 cc. of alcohol, 9.8 grams of pure dry sodium sulphanilate, 15 cc. of water, and 5 grams of aqueous 30% formaldehyde solution is boiled under a reflux condenser for two hours.

A clear solution is obtained which, on dilution with water, gives no precipitate. Upon evaporation of the solution in vacuo, a yellowish, powdery solid readily soluble in water is obtained. Upon acidification of its aqueous solution with dilute sulphuric acid, the free acid precipitates. This acid can be purified by dissolving it in dilute sodium bicarbonate solution, filtering and extracting with ether to remove any traces of unreacted dichlorophenol and precipitating the free acid by means of dilute hydrochloric or sulphuric acid. The free acid thus obtained is a white crystalline powder. It is difficultly soluble in water or alcohol, but dissolves readily in ammonia, ethanolamine, potassium carbonate or other alkalis to form the corresponding water-soluble salts.

Example 2

A mixture consisting of 17.9 grams of anhydrous sodium naphthionate, 9 grams of guaiacol, 40 cc. of alcohol, and 7.5 grams of 30% formaldehyde is boiled under reflux for one and one-half hours. The solvent is then removed by evaporation under reduced pressure leaving a tan-colored powder, readily soluble in water. The free acid can be precipitated from a concentrated aqueous solution of the above sodium salt by treatment with concentrated hydrochloric acid. It separates as a thick syrup, readily soluble in warm water.

*Example 3*

A mixture consisting of 15 grams of p-ter-butyl-phenol (0.1 mol.), 60 cc. of alcohol, 20 grams of 30% formaldehyde (0.2 mol.) and 39 grams of anhydrous sodium sulphanilate (0.2 mol.) is boiled under reflux for seven hours. The clear solution is evaporated to dryness in vacuo, leaving a yellowish-white powder which dissolves readily in cold water, yielding a clear solution having a tendency to form a heavy froth when shaken. The free acid can be precipitated from this solution by the addition of concentrated hydrochloric acid. It separates as a heavy syrup which crystallizes to a semi-solid mass. It dissolves readily in water to give a foamy solution.

*Example 4*

A phenolic formaldehyde resin is prepared by boiling 7 mols of phenol with 6 mols of formaldehyde in the presence of hydrochloric acid as a catalyst and, when the odor of formaldehyde has disappeared, steam-distilling off unchanged phenol at 170° C. and heating the residue till a hard resin is formed. The resin melts at about 75° C. and is readily soluble in caustic soda solution.

A mixture of 15 grams of the above resin, 27 grams of sodium sulphanilate, 50 cc. of alcohol, 20 cc. of water and 17 grams of 30% fomaldehyde is boiled under reflux for one hour until a clear solution is obtained which, upon dilution with water, gives no precipitate. The product is isolated as a yellow, water-soluble resin by evaporating the water and alcohol. The free sulphonic acid can be precipitated from solution with dilute hydrochloric acid. It is readily soluble in hot water, dilute ammonia or sodium bicarbonate solution.

*Example 5*

A mixture consisting of 22.8 grams of p,p'-dihydroxy-diphenyl-dimethyl-methane, 20 grams of anhydrous sodium sulphanilate, 75 cc. of alcohol and 11 grams of 30% formaldehyde solution is boiled for seven hours under reflux. The solvent is removed by evaporation under reduced pressure leaving a white power which dissolves readily in cold water to give a clear, foamy solution. Upon acidification with dilute hydrochloric acid, the corresponding sulphonic acid is obtained as a white, resinous mass which is soluble in ammonia or sodium bicarbonate solution.

*Example 6*

A mixture consisting of 8.5 grams of orthophenylphenol, 9.8 grams of sodium sulphanilate, 20 cc. of alcohol, 15 cc. of water and 5 grams of 30% formaldehyde is boiled for two hours under reflux. The clear solution obtained is evaporated to dryness in vacuo, leaving a pale yellow powder, readily soluble in water. Upon acidification of this solution with dilute hydrochloric acid, the free sulphonic acid precipitates as a white powder.

*Example 7*

A mixture of 10.3 grams of p-$\alpha,\alpha,\gamma,\gamma$-tetramethylbutylphenol, 50 cc. of alcohol, 20 grams of dry sodium sulphanilate, 10 grams of 30% formaldehyde solution, and 0.5 grams of sodium carbonate in 5 cc. of water is boiled under reflux for seven hours. The clear solution obtained is evaporated to dryness under reduced pressure, leaving a white powder which dissolves readily in water to give a frothy, soap-like solution. Upon acidification with dilute hydrochloric acid, the free sulphonic acid precipitates as a white powder. It is readily soluble in alcohol, ammonium hydroxide or sodium bicarbonate solutions.

*Example 8*

A mixture of 16.4 grams of p-ter-amylphenol, 50 cc. of alcohol, 35 grams of metanilic acid, 18 grams of sodium bicarbonate, 20 grams of 30% formaldehyde solution, and 20 cc. of water is boiled under reflux for five and one-half hours. The clear solution obtained is evaporated to dryness in vacuo leaving a tan-colored, resinous powder which dissolves readily in water to a clear, foamy solution.

*Example 9*

A mixture of 9.2 grams of p-benzylphenol, 20 grams of anhydrous sodium sulphanilate, 11 grams of 30% formaldehyde, 50 cc. of alcohol, and 0.5 grams of sodium carbonate in 5 cc. of water is boiled under reflux for six and one-half hours. The cream-colored powder obtained after removal of the solvent in vacuo dissolves in water to a foamy solution.

*Example 10*

A mixture consisting of 17.6 grams of p-cyclohexylphenol, 40 grams of anhydrous sodium sulphanilate, 22 grams of 30% formaldehyde solution, 100 cc. of alcohol, and 1 gram of sodium carbonate in 25 cc. of water is boiled under reflux for six hours. On cooling, the mixture solidifies to a crystalline mass which dissolves readily in water to give a clear, foamy solution.

*Example 11*

A mixture of 11 grams of p-$\alpha,\alpha,\gamma,\gamma$-tetramethylbutylresorcinol, 20 grams of sodium sulphanilate, 11 grams of 30% formaldehyde, 50 cc. of alcohol, 10 cc. of water and 2 grams of 10% soda solution is boiled under reflux for six hours. The solution obtained is evaporated to dryness in vacuo at 80° to 90° C. leaving a tan-colored powder which dissolves in warm water to give a foamy solution.

*Example 12*

One mol. of phenol, one mol. of sodium sulphanilate and one mol. of formaldehyde (30% solution) in an equal volume of water is boiled under reflux for five hours. Traces of unreacted phenol are removed by distillation with steam. The still residue is evaporated to dryness leaving a water-soluble powder.

*Example 13*

A mixture consisting of 22.8 grams of p,p'-dihydroxy-diphenyl-dimethyl methane, 80 cc. of alcohol, 20 grams of 30% formaldehyde solution, and a solution of sodium-N-methyl sulphanilate (prepared from 8.5 grams of sodium hydroxide, 15 cc. of water and 37.4 grams of N-methyl sulphanilic acid) is boiled seven hours under reflux. The condensation product obtained after removal of the solvent is a tan-colored powder which is completely and readily soluble in cold water.

Although the use of certain aromatic sulphonates has been described in detail due to their cheapness and availability, it is nevertheless understood that other amino aromatic sulphonates, such as phenylhydrazine-p-sulphonic acid, o-toluidine-p-sulphonic acid, diphenylamine-sulphonic acid, p-amino-dimethylaniline-sulphonic acid, N-methyl-naphthionic acid, etc. can be used to replace in whole or in part an equivalent molecular proportion of those shown in the above examples.

I claim:

1. The process which comprises condensing p-ter-butylphenol, formaldehyde and sodium sulphanilate in an acid-free medium.

2. The process which comprises condensing an alkylated phenol capable of forming methylol derivatives, formaldehyde and an alkali metal salt of sulphanilic acid in an acid-free medium.

3. The process which comprises condensing an alkylated phenol capable of forming methylol compounds, formaldehyde, and an alkali metal salt of an amino phenyl sulphonic acid in an acid free medium, said amino phenyl sulphonic acid containing a replaceable hydrogen atom on the amino group.

4. The process which comprises condensing an alkylated phenol capable of forming methylol compounds, formaldehyde and an alkali metal salt of one of the group consisting of primary and secondary amino phenyl sulphonic acids and primary and secondary amino naphthyl sulphonic acids in an acid-free medium.

5. The process which comprises condensing a phenol having a nuclear hydrocarbon substituent and being capable of forming methylol derivatives, formaldehyde and an alkali metal salt of one of the group consisting of primary and secondary amino phenyl sulphonic acids and primary and secondary amino naphthyl sulphonic acids in an acid-free medium.

6. The process which comprises condensing a phenol capable of forming methylol derivatives, formaldehyde and an alkali metal salt of one of the group consisting of primary and secondary amino phenyl sulphonic acids and primary and secondary amino naphthyl sulphonic acids in an acid-free medium.

7. The process which comprises condensing a phenol capable of forming methylol derivatives, formaldehyde and an alkali metal salt of one of the group consisting of primary and secondary amino phenyl sulphonic acids and primary and secondary amino naphthyl sulphonic acids in an acid-free medium, and acidifying the resulting product.

8. The process which comprises condensing a phenol having a nuclear hydrocarbon substituent and being capable of forming methylol derivatives, formaldehyde and an alkali metal salt of one of the group consisting of primary and secondary amino phenyl sulphonic acids and primary and secondary amino naphthyl sulphonic acids in an acid-free medium and acidifying the resulting product.

9. The process which comprises condensing p-ter-butylphenol, formaldehyde and sodium sulphanilate in an acid-free medium and acidifying the resulting product.

10. A condensation product of p-ter-butylphenol, formaldehyde and sodium sulphanilate, condensed in an acid free medium.

11. The sulphonic acid obtained by acidifying the condensation product of p-ter-butylphenol, formaldehyde and sodium sulphanilate, condensed in an acid free medium.

12. The condensation product of a phenol having a nuclear hydrocarbon substituent and being capable of forming methylol derivatives, formaldehyde and an alkali metal salt of one of the group consisting of primary and secondary amino phenyl sulphonic acids and primary and secondary amino naphthyl sulphonic acids, condensed in an acid free medium.

13. The sulphonic acid obtained by acidifying the condensation product of a phenol having a nuclear hydrocarbon substituent and being capable of forming methylol derivatives, formaldehyde and an alkali metal salt of one of the group consisting of primary and secondary amino phenyl sulphonic acids and primary and secondary amino naphthyl sulphonic acids, condensed in an acid free medium.

14. A condensation product of a phenol capable of forming methylol derivatives, formaldehyde and an alkali metal salt of one of the group consisting of primary and secondary amino phenyl sulphonic acids and primary and secondary amino naphthyl sulphonic acids, condensed in an acid free medium.

15. The sulphonic acid obtained by acidifying the condensation product of a phenol capable of forming methylol derivatives, formaldehyde and an alkali metal salt of one of the group consisting of primary and secondary amino phenyl sulphonic acids and primary and secondary amino naphthyl sulphonic acids, condensed in an acid free medium.

HERMAN A. BRUSON.